Figure 5:
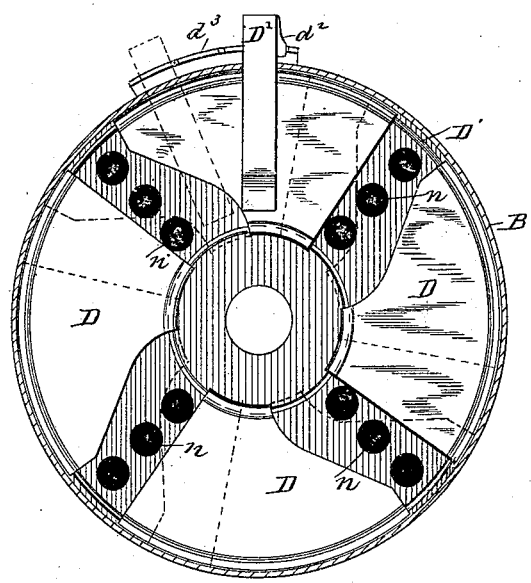

(No Model.)  2 Sheets—Sheet 1.
J. J. HUBBELL.
MACHINE FOR PEARLING WHEAT AND OTHER GRAIN.
No. 337,160.  Patented Mar. 2, 1886.
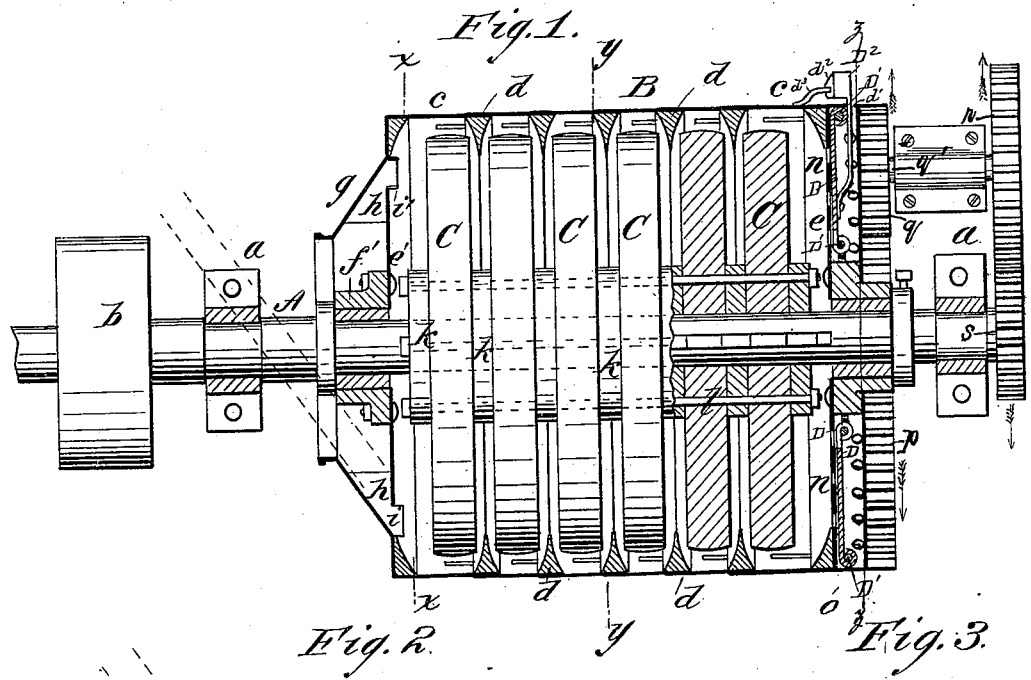
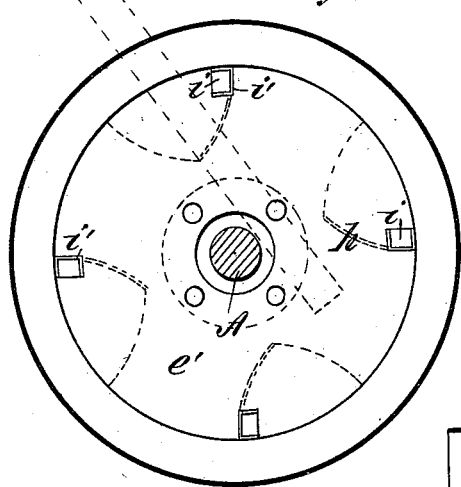
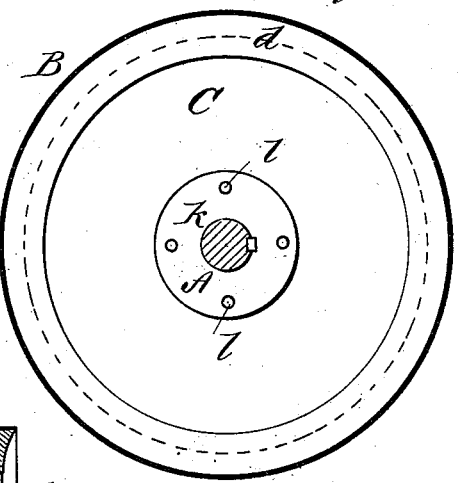
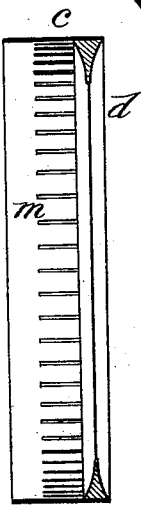
WITNESSES:
Donn Twitchell
C. Sedgwick
INVENTOR:
J. J. Hubbell
BY Munn & Co
ATTORNEYS.

(No Model.) 2 Sheets—Sheet 2.

J. J. HUBBELL.
MACHINE FOR PEARLING WHEAT AND OTHER GRAIN.

No. 337,160. Patented Mar. 2, 1886.

WITNESSES:
Donn Twitchell
C. Sedgwick

INVENTOR:
J. J. Hubbell
BY Munn & Co.
ATTORNEYS.

United States Patent Office.

JOHN J. HUBBELL, OF BENZONIA, MICHIGAN.

MACHINE FOR PEARLING WHEAT AND OTHER GRAIN.

SPECIFICATION forming part of Letters Patent No. 337,160, dated March 2, 1886.

Application filed December 5, 1884. Serial No. 149,568. (No model.)

*To all whom it may concern:*

Be it known that I, JOHN J. HUBBELL, of Benzonia, in the county of Benzie and State of Michigan, have invented a new and Improved Machine for Pearling Wheat and other Grain, of which the following is a full, clear, and exact description.

The object of my invention is the removal of the thin outer skin or bran from wheat and other grain, so as to leave the berries whole, and in the case of wheat to leave the nutritious portions that lie next to the bran, and furnish a product that can be readily cooked. To these ends I construct a machine in which a revolving shaft carrying numerous disks of stone is combined with a hollow drum or cylinder, and the feed is regulated by devices of novel character, all as hereinafter described and claimed.

Reference is to be had to the accompanying drawings, forming a part of this specification, in which similar letters of reference indicate corresponding parts in all the figures.

Figure 1 is a vertical longitudinal section of my improved pearling-machine. Fig. 2 is a cross-section on the line $x\,x$. Fig. 3 is a cross-section on the line $y\,y$. Fig. 4 represents a half of one of the sections of the drum; and Fig. 5 is a sectional view taken on the line $z\,z$ of Fig. 1.

A is a shaft supported horizontally in boxes $a\,a$, and provided with a driving-pulley, $b$. Upon and around the shaft is a drum or cylinder, B, made up of a series of cylindrical sections, $c$, fitted each with an interior beveled ring, $d$. At one end the drum is attached to a double head formed of two disks, $e$, which are bolted to a hub, $f$, that is free to revolve upon and independently of the shaft A, said box, as also the box of the other head of the drum or cylinder, (presently referred to,) being preferably provided with a lining of Babbitt or soft metal to reduce to a minimum frictional contact between the same and the shaft. At the opposite end the drum is provided with a head, $e'$, bolted to a hub, $f'$, on the shaft, and the head $e'$ is formed with a conical hood or projection, $g$, that is provided with wings $h$ adjacent to openings $i$ in head $e'$. The openings $i$ are protected by small hoods $i'$, projecting inward from the head in such a manner as to ward off the grain already in the drum, so that by the reverse motions of the disks and head there will be a space formed into which the incoming grain enters. This hood and its wings form a force-feed device that causes a uniform and continuous feed of the grain to the drum B from the delivery-spout that discharges into the hood.

Upon the shaft A are the series of disks C, separated by rings $k$, which are keyed to the shaft. These disks may be of any suitable material—such as emery-wheels, or wheels or disks of any kind of composition; but stone is preferable, and grindstones can be utilized by boring holes through them near the center and attaching them to the rings $k$ by bolts $l$, passed through the stones and rings. The disks or stones are slightly smaller in diameter than drum B, so as to leave a space for passage of the grain; but the stones project between the rings $d$, or into the spaces between the rings. The sections $c$ are slotted, as shown most clearly in Fig. 4, to allow escape of dust and bran. At the discharge end of the drum the inner head, $e$, is provided with series of radially-disposed apertures, $n$, to allow escape of the grain into the space between the two heads, and there are also apertures $o$ in the periphery of the double head for final discharge of the grain. The closing of a portion of apertures $n$, by means preferably of the contrivance as shown in Fig. 5, regulates the discharge to the extent required for keeping the machine filled with grain to the extent required. Said contrivance may consist of a series of gates or plates, D, one for each series of apertures $n$, said gates or plates being connected to concentric rings of stout wire D' at their inner and outer ends, respectively, which rings are adapted to have a limited movement in the arc of a circle, the outer one being confined by a flange of the casing of the cylinder or drum, while to one of the plates or gates is secured an offset arm or bar, $D^2$, projecting through a slot, $d'$, in said cylinder or drum casing, and engaging, being formed with knife-edged flanges $d^2$ at its side edges, with a rack or toothed bar, $d^3$, secured to and standing a little above said casing. The rear edge of each plate or gate D stands radially to the inner ring, while the front edge of the plate or gate stands nearly tangentially or obliquely to said ring to permit, as will be observed from Fig. 5, the partial closing of each series of the apertures n.

The machine being constructed with the desired number of sections, and in practice set up with the tail end slightly lower than the feed end, the shaft A is connected with power, so as to be rotated rapidly. The drum B is also to be rotated by suitable means at a slow speed and in a reverse direction to the shaft, which means of rotation may consist of an inner circle of cogs or teeth, p, upon the drum B, geared with a pinion, q, of a suitably-journaled shaft, q', driven by a second pinion, r, thereon at its outer end, which latter pinion, r, gears with a pinion, s, on the shaft A, the plane of rotation of all of which pinions is indicated by arrows. The grain supplied to the feed-chamber or hood g is forced into the drum into contact with the first stone and filling the first section. It then passes to the second, and so on until the drum is filled. In each section the grain is acted on by the stone, which rubs off the bran without breaking the berry, so that by the time the grain reaches the discharge end it is thoroughly cleaned or pearled.

The drum or cylinder is made in sections, for convenience in assembling the stones or disks, with their separating-rings k, upon the shaft, and to permit of the alternating of the stones with the rings d, the openings of the latter being of less diameter than the stones or disks.

For pearling wheat this machine is especially useful, as it removes only the thin skin from the grain and leaves the nutritious portions, which are usually lost in the ordinary process of making fine flour.

It will be understood that I make no claim to the specific means herein employed for regulating the amount of discharge.

Having thus fully described my invention, I claim as new and desire to secure by Letters Patent—

1. In a pearling-machine, the combination, with the shaft and disks or stones, of the drum or cylinder having a double head formed of spaced-apart disks or plates, both the inner disk and the periphery of said head having apertures, and means whereby a portion of said apertures are adapted to be closed, substantially as and for the purpose set forth.

2. In a pearling-machine, the head e', provided with hooded apertures i, the hood g, and wings h, forming a force-feed, combined with drum B, disks C, and shaft A, substantially as described.

3. In a pearling-machine, the drum B, provided with a double head formed of disks e, having apertures n o, combined with shaft A and disks C, substantially as described.

JOHN J. HUBBELL.

Witnesses:
WM. W. ROTHGEB,
A. N. WHITCOMB.